United States Patent [19]
Bosetti et al.

[11] 3,984,065
[45] Oct. 5, 1976

[54] TAPE TRANSPORT SYSTEM

[75] Inventors: Max C. Bosetti, Berwyn; Uday W. Joshi, Paoli, both of Pa.

[73] Assignee: Computer Peripherals, Inc., Edina, Minn.

[22] Filed: Mar. 13, 1975

[21] Appl. No.: 557,983

[52] U.S. Cl. .................................... 242/184; 318/7
[51] Int. Cl.² ................... G11B 15/06; G11B 15/58; G11B 23/12
[58] Field of Search ........... 242/183, 184, 185, 191, 242/208, 209, 206; 360/69, 32; 317/6, 7

[56] References Cited
UNITED STATES PATENTS

| | | | |
|---|---|---|---|
| 3,673,473 | 6/1972 | Werner | 318/7 |
| 3,713,606 | 1/1973 | Van Pelt et al. | 242/184 |

*Primary Examiner*—Leonard D. Christian
*Attorney, Agent, or Firm*—J. T. Cavender; Wilbert Hawk, Jr.; Jeffrey P. Morris

[57] ABSTRACT

A magnetic tape transport system having a linear reel control in which the difference between tape velocity into and out of a pair of buffer columns is digitally integrated to provide a continuous signal indicative of the tape loop position in the buffer column, which signal, when combined with the tape velocity data, provides a precise reel servo control. Minimum length buffer columns with no loop position sensors are disclosed in a first embodiment and the use of minimum numbers of loop position sensors are disclosed in further embodiments.

Three digital tachometers sense the tape speed at the capstan and at the reel side of each buffer column. The capstan tachometer data is separately summed with the data from each of the reel tachometer and digitally integrated to provide position feedback data indicative of the tape position in the buffer columns which, together with the velocity feedback, controls the reel servos such that loop acceleration is linear and independent of the tape pack radii of the reels.

33 Claims, 16 Drawing Figures

FIRST ORDER RESPONSE

SECOND ORDER RESPONSE

TAPE TRANSPORT SYSTEM

BACKGROUND OF THE INVENTION

1. Field of the Invention

The present invention relates to magnetic tape transport systems, and more particularly to tape transport systems in which magnetic tape is bidirectionally transferred between a pair of reels while maintaining a substantially linear acceleration of the tape loops in associated buffer columns during tape acceleration and deceleration intervals and with a control response independent of the tape diameter on the reels.

2. Description of the Prior Art

Magnetic tape transport systems in which high tape speeds occur intermittently and bidirectionally require servo controls to enable the tape to rapidly accelerate and decelerate to and from a desired running speed without data loss or distortion resulting from variations in tape speed caused by non-linear system frequency response, or errors in the sensed position or velocity of the tape from which the various servo control signals are derived. Systems of the prior art, particularly single capstan tape transports, generally require longer than optimum buffer columns for the tape since the system response is incapable of responding quickly enough to use such short length buffer columns. Other problems, such as erroneous tape speed and position servo control signals are caused by variation in the reel tape pack radius, dependence upon potentially inaccurate position or velocity information from more than a minimum of loop sensors, a lack of continuous tape loop position information, and limit cycling or oscillation of the tape in the buffer columns are all problems of systems of the prior art which are overcome by the present invention.

The tape transport system described by U.S. Pat. No. 3,304,018, wherein the tape loop acceleration is a function of the tape pack radius, is nonlinear, and employs longer than optimum buffer columns is illustrative of the prior art. Additionally, by biasing the tape position sensors, the referenced patent further increases the required buffer length.

Another tape transport system of the prior art is described by U.S. Pat. No. 3,713,606 in which velocity information is digitally quantized, resulting in limit cycling of the tape loops in the buffer columns and high power use. In the present invention, tape loop acceleration is independent of reel size, with loop acceleration being linear, thereby enabling the use of optimally short buffer columns without limit cycling and with the tape loop stablized at the point of maximum displacement in the buffer columns.

U.S. Pat. No. 3,454,960 is illustrative of another tape transport system of the prior art in which a large number of loop sensors are employed.

Another system of the prior art is described by U.S. Pat. No. 3,319,901 in which the tape reel servo motor is controlled by summing signals representative of tape speed, direction and position, with the position signals being derived from a plurality of points representing different loop lengths.

SUMMARY OF THE INVENTION

The present invention comprises a flexible material transport system and control therefor in which web material, such as magnetic tape, is bidirectionally transferred between two reels, is transported at high speed and with substantially linear loop acceleration and deceleration. A reel control system provides loop position and tape velocity data in a first embodiment without the use of loop position sensors. In additional embodiments, a minimum number of loop position sensors are employed to maintain an average reel speed while stabilizing the tape loop at a predetermined position in the buffer columns.

A single capstan drive system is disclosed in which a capstan tachometer and a pair of reel tachometers provide tape velocity data into and out of the buffer columns. The difference of these velocities which, for each buffer column is digitally integrated to provide a continuous analog of the tape loop position in the buffer columns. The combined position and velocity data for each loop is then used to provide position and velocity feedback control signals to the reel motor servos such that the system frequency response, the tape velocity, and the loop position is independent of the reel tape pack radii. Additionally, stabilization of the tape loop at the points of maximum displacement is achieved without limit cycling.

It is therefore a primary object of the present invention to provide a digital tape transport system for precisely transporting magnetic tape between a pair of storage reels.

A further object of the present invention is to provide a single capstan magnetic tape transport system having optimized length buffer columns.

A further object of the present invention is to provide a digital servo control system for a tape transport in which servo control is obtained by integration of differential tape velocities to provide analog position data.

Yet another object of the present invention is to provide a tape transport system in which the tape loops stablize at the points of maximum displacement in the buffer columns without limit cycling.

Yet another object of the present invention is to provide a web transport system for a flexible media in which the system control response is independent of the radii of flexible media on storage reels between which it is bidirectionally transported.

Yet another object of the invention is to provide a magnetic tape transport having a minimum number of loop sensors.

The foregoing and other features and advantages of the invention will be apparent from the following more detailed description of preferred embodiments of the invention, as illustrated by the accompanying drawings.

BRIEF DESCRIPTION OF THE DRAWINGS

FIGS. 10(A) through 10(L) are a series of waveform diagrams illustrative of the operation of the present invention.

DESCRIPTION OF THE PREFERRED EMBODIMENTS

Figure 1A:
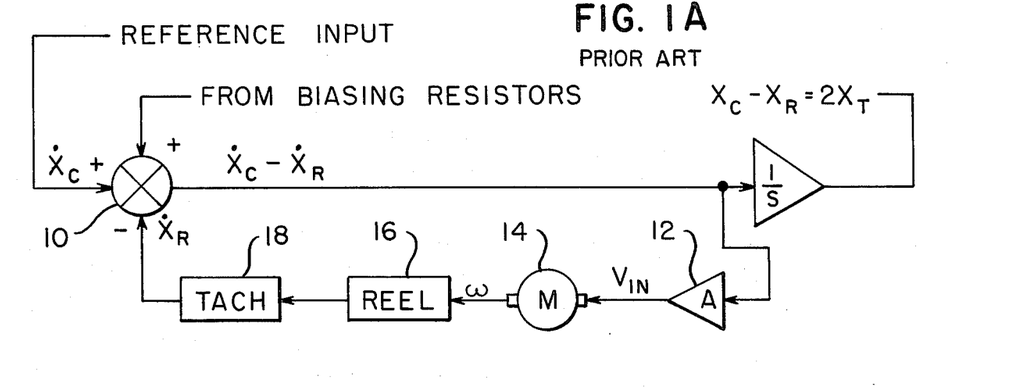
FIG. 1(A) is a simplified block diagram of a reel control system of the prior art.
Figure 1B:
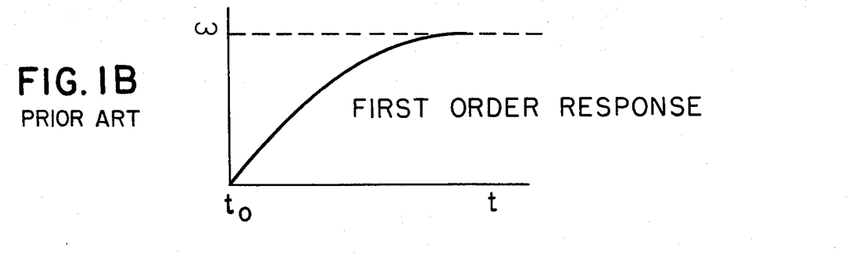
FIG. 1(B) is a waveform of the frequency response of the system of FIG. 1A.

Referring now to FIGS. 1A and 1B, the simplified block diagram is illustrative of tape drive systems of the prior art, such as the system described by U.S. Pat. No. 3,304,018. The system of FIG. 1A has a nonlinear first order frequency response as shown by the waveform of FIG. 1B. Only those system elements necessary to illustrate this nonlinearly are shown. A drive capstan is rotated in response to a drive signal causing its associated tachometer to generate an analog voltage having a magnitude representative of the capstan tape velocity and a polarity representative of the direction of rotation of the capstan. This analog capstan tape velocity signal $\dot{X}_c$ is coupled to a summing junction 10 together with bias signals from a number of summing resistors and with the linear reel tape velocity signal $\dot{X}_R$. The output signal from summing junction 10, $2\dot{X}_T$, represents the difference between capstan tape velocity and reel tape velocity, which is twice the tape velocity up or down in the associated buffer column. Since tape both enters and leaves the buffer column, $$\dot{X}_T = 1/2\ (\dot{X}_c - \dot{X}_R)$$

After appropriate scaling (not shown) $\dot{X}_T$ is amplified by amplifier 12 after which it drives reel motor 14 to cause reel 16 to turn and tachometer 18 to generate a new reel tape velocity signal $\dot{X}_R$, thereby completing the servo loop. Using the Laplace transformation, the open loop frequency response of the above-described servo loop is calculated as follows:

$$\frac{\dot{X}_R}{\dot{X}_c} = \frac{Ar}{sT_m+1};$$

where
 s is the Laplace operator
 $T_m$ is the motor 14 time constant
 A is the gain of amplifier 12
 r is the radius of reel 16
 $K_B$ is the back EMF constant of motor 14 The resultant closed loop frequency response is $$\frac{X_T}{\dot{X}_c} = \frac{\frac{K_B}{Ar+1}(sT_m+1)}{sT_m\left(\frac{K_B}{Ar+1}\right)+1}$$

which corresponds to the nonlinear response curve of FIG. 1B. Since the frequency response is nonlinear, the tape buffers cannot be optimally designed. The biasing input introduces system error which adds to $\dot{X}_T$. Also, the loop acceleration and velocity are not only nonlinear, but are a function of the reel radius of tape.

Figure 2A:
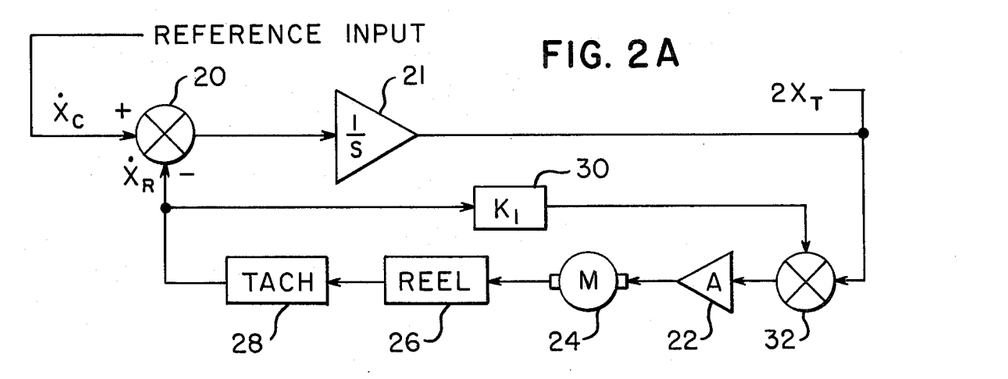
FIG. 2(A) is a simplified block diagram of a reel control system in accordance with the present invention.
Figure 2B:
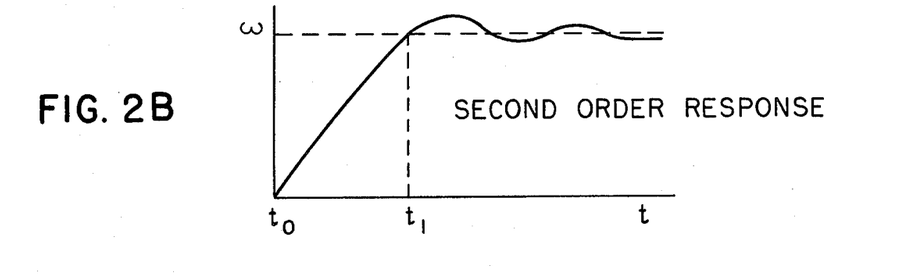
FIG. 2(B) is a waveform of the frequency response of the system of FIG. 2A.

FIGS. 2A and 2B illustrate a simplified block diagram and associated frequency response curve in accordance with the present invention. As will be apparent with reference to FIG. 2A and to the description which follows, the acceleration of the tape loop in the buffer of a tape transport having a frequency response as shown by FIG. 2B is substantially independent of the reel size, and is substantially linear with a consequent decrease in the maximum loop length which has heretofore been required. Additional velocity loop feedback gain $K_1$ is introduced into the servo loop to linearize the acceleration of the tape loop in the buffer.

The capstan tape velocity signal $\dot{X}_c$ and the reel tape velocity signal $\dot{X}_R$ are algebraically combined at summing junction 20, the output of which is twice the vertical tape loop velocity in the tape buffer. The vertical tape loop velocity signal $\dot{X}_T$ is integrated by integrator 21 to derive a position feedback signal $X_T$ which is mathematically defined as $$X_T = \int_0^\infty \dot{X}_T dt = \int_0^\infty \frac{1}{2}(\dot{X}_c - \dot{X}_R)dt$$

This signal $X_T$ is then amplified by servo amplifier 22 and drives reel motor 24 which is mechanically coupled to tape reel 26 and its associated tachometer 28. The digital output $\dot{X}_R$ of tachometer 28, indicative of the tape velocity at the reel 26, is fed back through operational amplifier 30, which performs a digital to analog conversion by means of, for example, a one shot multivibrator and associated filter. This velocity feedback with a gain $K_1$ from amplifier 30 is algebraically combined at summing junction 32 with $X_T$ to provide a second order frequency response which results in substantially linear acceleration over the range $t_0$ to $t_1$ as illustrated by FIG. 2B. Operationally, the tape of a tape transport system will accelerate and decelerate faster with the configuration of FIG. 2A than with the configuration of FIG. 1A. The system frequency response of the configuration of FIG. 2A is calculated as follows:

$$\frac{X_T}{\dot{X}_c} = \frac{\left(K_1 = \frac{K_B}{Ar}\right)\left[s\left(\frac{JR}{K_T}\right)\left(\frac{1}{ArK_1+K_B}\right)+1\right]}{s^2 T_m \left[\frac{K_B}{(ArK_1+K_B)^2}\right] + s\left(K_1+\frac{K_B}{Ar}\right)+1}$$

The open loop frequency response is then:

$$\frac{\frac{rA}{rAK_1+K_B}}{s\left[s\frac{JR}{K_T(K_B+rAK_1)}+1\right]}$$

where
 J = moment of inertia of the reel motor 24 and reel 26 including the tape,
 R = the motor resistance, and
 $K_T$ = the motor torque constant.

Assuming the $rA >> K_B$, then the open loop frequency response equals:

$$\frac{\frac{1}{K_1}}{s\left[s\frac{JR}{K_T rAK_1}+1\right]}$$

which generally corresponds to the response curve of FIG. 2B.

Figure 3:
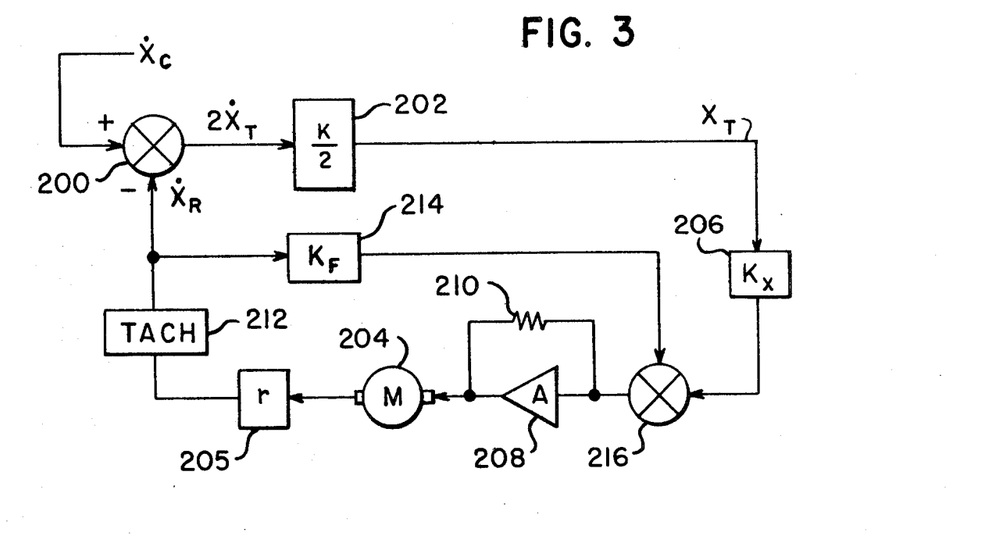
FIG. 3 is a simplified block diagram of an embodiment of the present invention.
Figure 4:
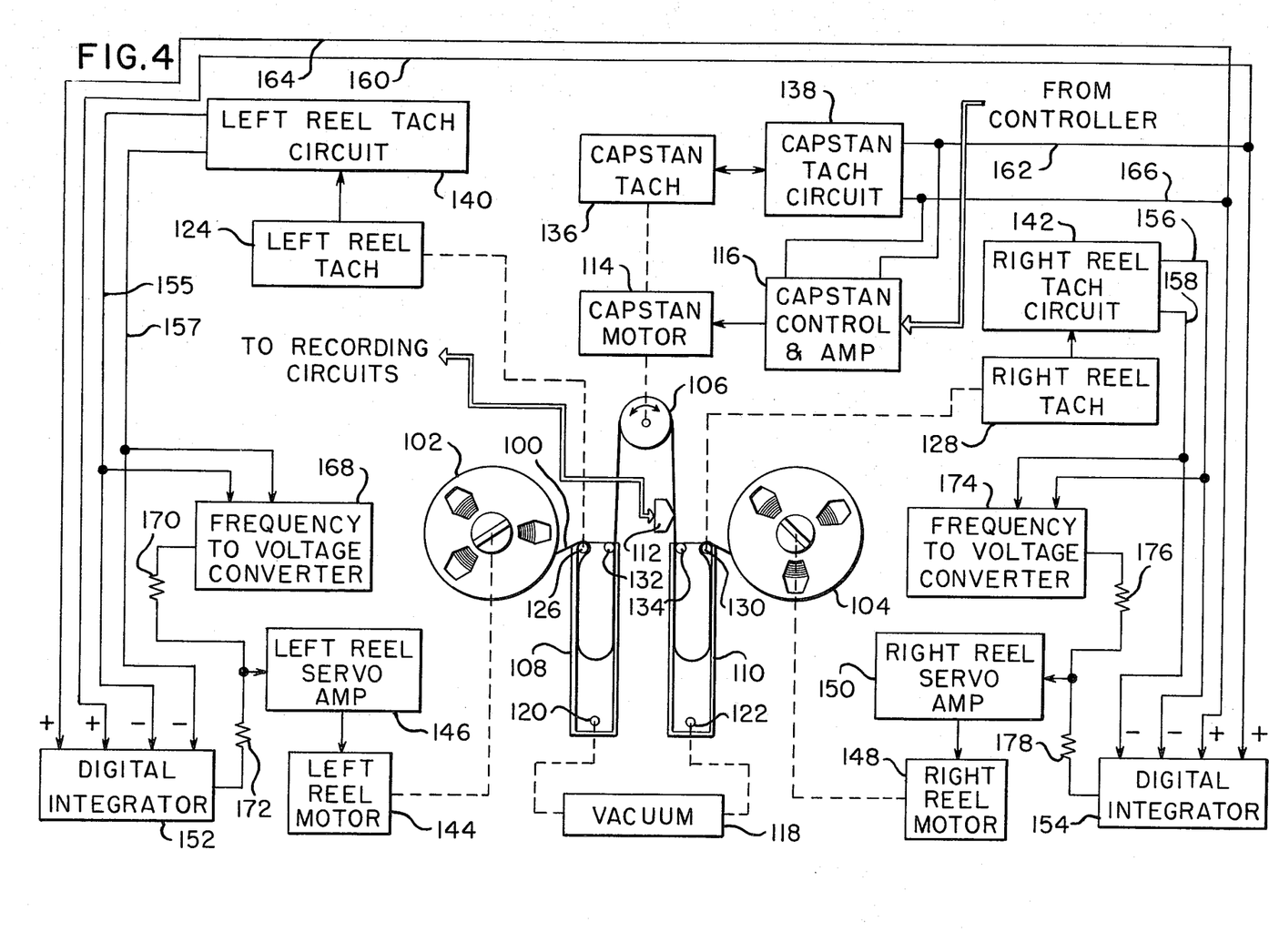
FIG. 4 is a detailed block diagram of the embodiment illustrated by FIG. 3.

Referring now to FIGS. 3 and 4, a linear tape reel control system in accordance with the present invention is illustrated generally by FIG. 4 while FIG. 3 illustrates the operation of the right reel control of FIG. 4. The left reel control operation is substantially identical to the right reel control operation.

Magnetic tape 100 is stored on a left storage reel 102 and on a right storage reel 104 for transport therebetween in response to motion of a single drive capstan 106. Any difference in the velocity of tape off either left reel 102 or right reel 104 and the capstan velocity will cause tape to be accumulated in either left buffer column 108 or right buffer column 110. A magnetic reading head 112 in close proximity to the capstan reads the data present on tape 100 and is coupled to data reproducing and recording circuitry in a known manner. Capstan 106 is mechanically coupled to the drive shaft of capstan motor 114 which motor in turn is excited for bidirectional rotation by excitation voltages generated by the capstan control and amplifier circuitry 116, in response to input commands from a central controller or computer. Tape motion is initiated by motion of the capstan 106 while tension of the tape is maintained by the introduction of a vacuum into the left and right buffer columns from a vacuum source 118 via vacuum ports 120 and 122. Tape motion into or out of the left buffer column 108 is detected by the left reel guide tachometer 124 which is mechanically coupled to a roller guide 126, while tape motion into or out of the right buffer column 110 is detected by the right reel guide tachometer 128 which is mechanically coupled to roller guide 130. Friction guides 132 and 134 are provided on the capstan sides of buffers 108 and 110, respectively, such that the tape path through the buffer columns is one of low inertia. Friction guides 132 and 134 may comprise air or roller guides of known construction.

Figure 10:
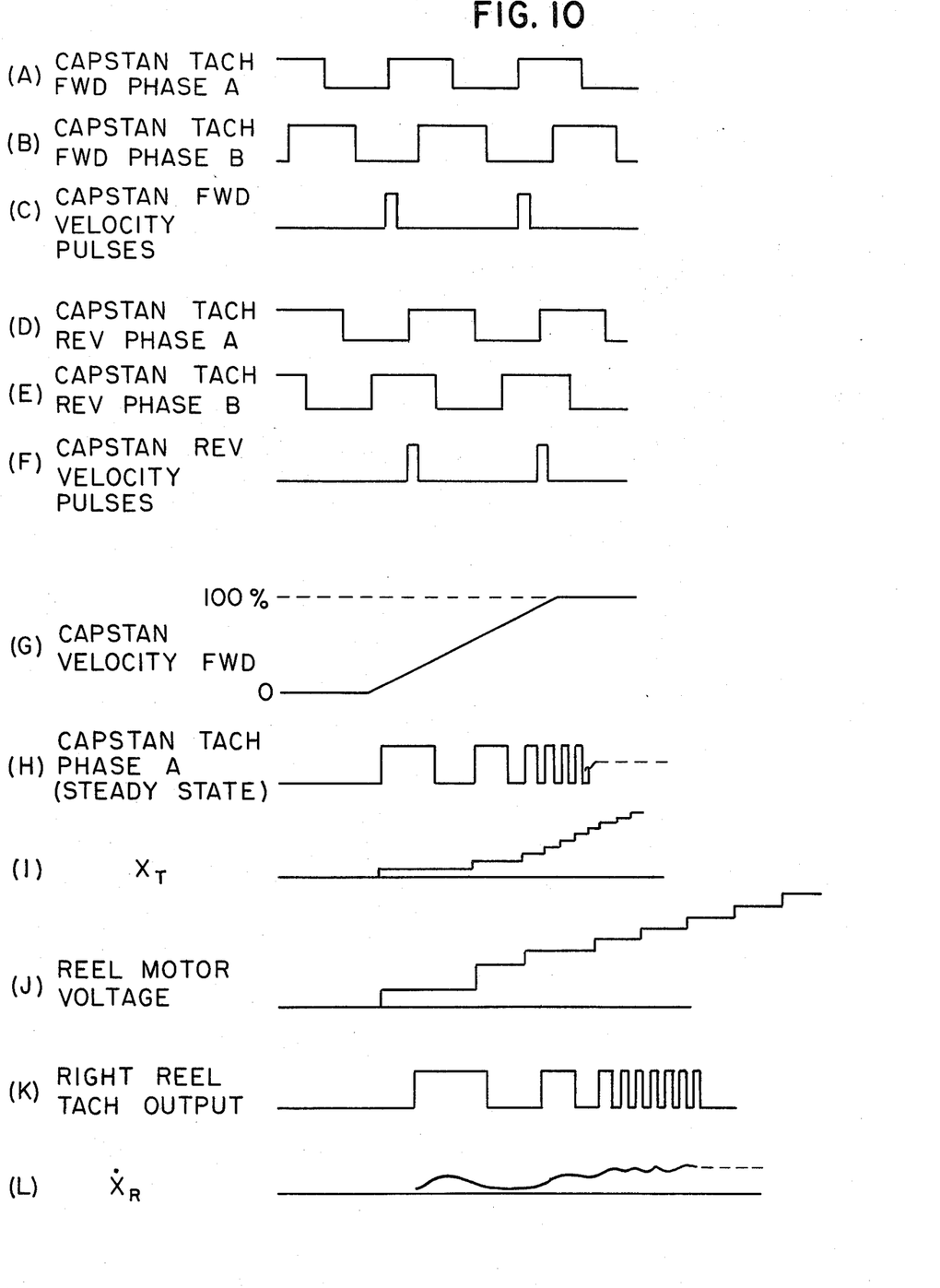

Tachometers 124 and 128 generate digital velocity signals representative of $X_R$, the reel tape velocity, for tape wound or unwound onto or from right reel 102 and left reel 104, respectively. Velocity signals $\dot{X}_R$ (right reel) and $\dot{X}_R$ (left reel) are bipolar so as to indicate whether tape is being wound onto or off of the reels. Thus, the polarity of the right reel velocity signal is complementary to the polarity of the left reel velocity signal, i.e., when $\dot{X}_R$ (right reel) is positive, $\dot{X}_R$ (left reel) is negative, and vice versa. Tachometers 134 and 128 are preferably of the photoelectric type in which a rotating disc having transmissive and opaque portions intercepts the light emitted from light emitting diodes. The light pulses are sensed by photocircuits associated with the tachometers to generate digital forward and reverse motion commands, which will be described in greater detail with reference to FIG. 10. Capstan tachometer 136, which is also preferably of the photoelectric type, detects tape motion initiated by the capstan and is preferably mechanically coupled to the capstan drive shaft from capstan motor 114. The capstan tachometer circuit 138 associated therewith generates a digital capstan tape velocity signal $\dot{X}_c$. There is no initial reel motion due to the tape loops in the buffers and hence no initial left or right reel tape velocity signals $\dot{X}_R$ are generated by either left reel tachometer circuit 140 or right reel tachometer circuit 142.

Left reel 102 is bidirectionally rotatable by left reel motor 144 which is mechanically coupled thereto and excited and controlled by a reel control voltage from the left reel servo amplifier 146. Correspondingly, right reel 104 is bidirectionally rotatable by right reel motor 148 which is mechanically coupled thereto and excited and controlled by a reel control voltage from the right reel servo amplifier 150.

The simplified reel control functional block diagram of FIG. 3 is illustrative of the operation of either the right or left reel control subsystems illustrated by FIG. 4. The capstan velocity $\dot{X}_c$, after detection by capstan tachometer 136, is coupled as a digital signal from capstan tachometer circuit 138 to a combining junction 200 which may comprise an adding network, with a polarity dependent upon the direction of rotation of the capstan. Since, as previously mentioned, there is no initial reel motion, no reel tape velocity input $\dot{X}_R$ is initially algebraically summed with $\dot{X}_c$, and the instantaneous initial servo error velocity, the output of combining junction 200, is twice the tape loop velocity $\dot{X}_T$ in the associated buffer column. A combined digital integrator and divide by two circuit 202 computes the instantaneous vertical tape loop position $X_T$ in the buffer column. Thus, $$\dot{X}_T = \frac{1}{2}(\dot{X}_c - \dot{X}_r), \text{ and}$$

$$X_T = \int_0^\infty \dot{X}_T\, dt.$$

When the amount of tape in either buffer column begins to increase as the capstan introduces additional tape into one of the buffer columns, the tape loop position output signal $X_T$ is fed back to control the reel motor 204, which corresponds to either motor 144 or motor 148 of FIG. 4, depending upon whether buffer column 108 or 110 is taking on tape. Analog position signal $X_T$ is coupled through a scaling network 206 which introduces a scaling factor $K_x$ which, for purpose of illustration, may be one; and after amplification by a frequency compensated operational amplifier 208 having a frequency compensation network 210, is applied to reel motor 204 as a reel control voltage. The resulting reel tape motion causes tachometer 212 to generate a reel tape velocity signal $\dot{X}_R$ in response to movement of reel 205, which velocity signal is summed with $\dot{X}_c$ at summing junction 200 to derive an indication of the rate at which tape is accumulating in the buffer, in the form of a corrected electrical analog of the tape velocity $\dot{X}_T$ at the integrator 202 input. The reel tape velocity signal $\dot{X}_R$ is also fed back through an amplifier 214 having a gain constant $K_F$, which is chosen together with the gain constant of servo amplifier 208 to accelerate motor 204 until the output of amplifier 214 is equal to the position feedback voltage $X_T$, and is algebraically summed with $X_T$ at combining junction 216. The loop response, being a function of the various amplifier gain constants, is substantially independent of the radius of the tape pack on reel 205, thus the same tape loop displacement in the buffer column will occur regardless of reel size. The control response is identical, for example, for all ANSI standard reels. The described reel control system will tend to position the tape loop at the center of the buffer column when the capstan is idle and at the point of maximum displacement when the capstan is moving. In normal operation, however, vacuum source 118 provides a constant pull on the tape, and consequently on the reels which provides a slight bias away from the center of the buffer. To offset this bias, the gains of amplifiers 208 and 214 may be chosen to provide compensation. In contrast to systems of the prior art, tape position is accurately controlled without the use of any loop position sensors by the configuration described with reference to FIG. 3.

The left reel tachometer circuit 140, more fully described with reference to FIG. 9, photoelectrically generates two phased pulse trains which are coupled to digital integrator 152 via lines 155 and 157, with the left reel reverse pulses present on line 155 and the left reel forward pulses on line 157. Correspondingly, right reel tachometer circuit 142 generates two phased pulse trains which are coupled to digital integrator 154 via lines 156 and 158, with the right reel reverse pulses on line 156 and the right reel forward pulses on line 158. The capstan tachometer circuit 138 also generates two phased pulse trains indicative of capstan tape velocity $\dot{X}_c$ in the forward and reverse directions, with the capstan forward pulses being coupled via line 160 to digital integrator 152 and via line 162 to digital integrator 154; and the capstan reverse pulses being coupled via line 164 to digital integrator 152 and via line 166 to digital integrator 154. The digital integration performed by integrators 152 and 154 upon the differences between the capstan tape velocity and left and right reel tape velocities respectively, in the forward or reverse directions, is coupled as a left reel position feedback signal from integrator 152 to the left reel servo amplifier 146 and as a right reel position feedback signal from integrator 154 to the right reel servo amplifier 150. The left reel forward and reverse pulses on lines 157 and 155 are also coupled to a digital to analog converter 168 to derive a reel velocity analog correction voltage to the left reel servo amplifier 146 after scaling by a speed scaling resistor 170. The gain of the operational amplifier included within D/A converter 168 corresponds to the gain $K_F$ of amplifier 214 of FIG. 3. The analog position correction output voltage from integrator 152 applied to the left reel servo amplifier 146 is loop scaled by loop scaling resistor 172, which corresponds to the scaling factor $K_x$ of scaling network 206 of FIG. 3.

Correspondingly, the right reel forward and reverse pulses on lines 156 and 158 are coupled to digital to analog converter 174 to supply a reel velocity analog correction voltage to the right reel servo amplifier 150 after scaling by a speed scaling resistor 176. The amplifier gain of D/A converter 174 also corresponds to the gain $K_F$ of amplifier 214 of FIG. 3. The analog position correction output voltage from integrator 154 applied to the right reel servo amplifier 150 is loop scaled by loop scaling resistor 178, which corresponds to the scaling factor $K_x$ of scaling network 206 of FIG. 3.

Figure 5:
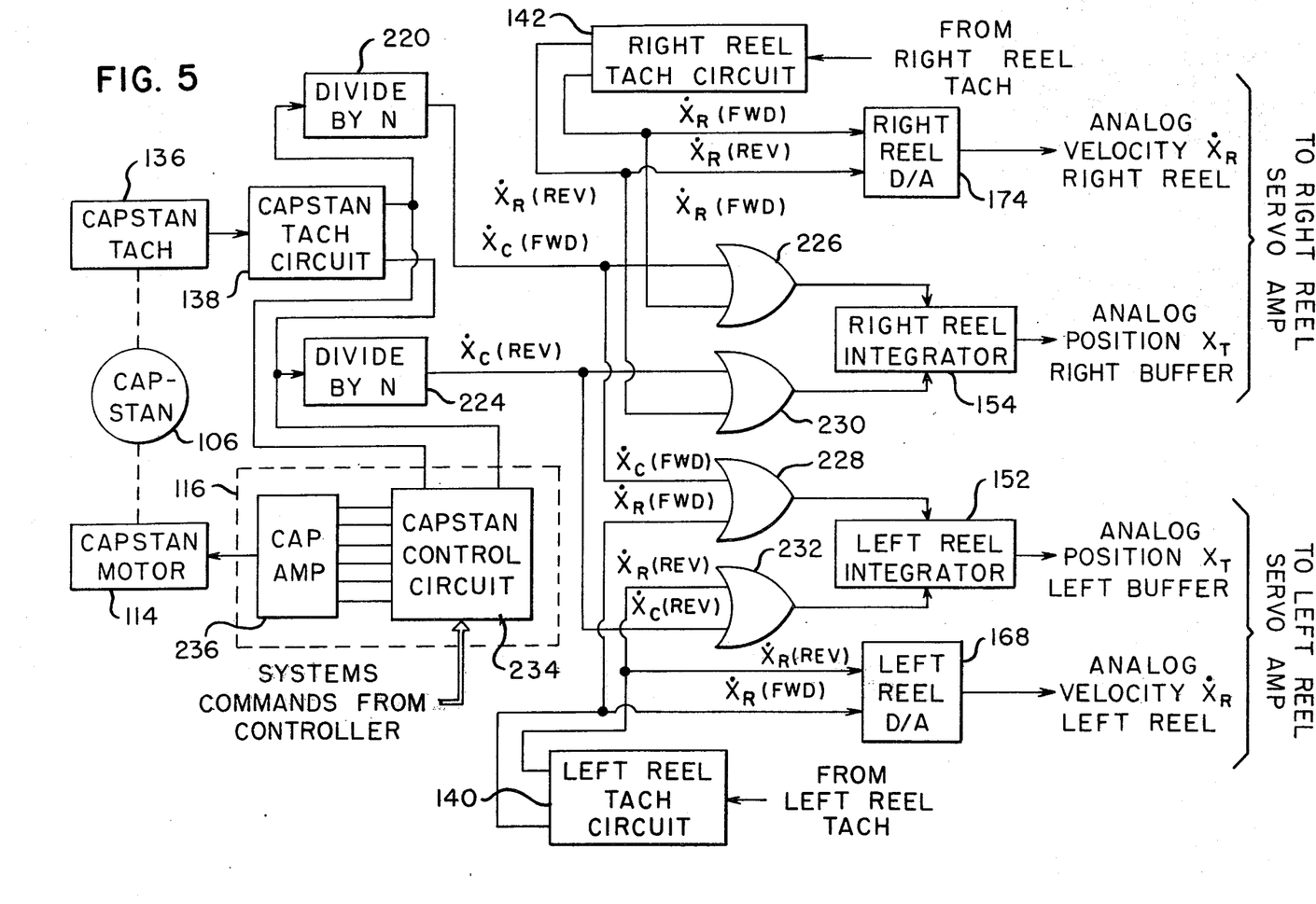
FIG. 5 is a combined block and circuit diagram showing the system of FIG. 4 in greater detail.

Referring now to FIG. 5, the derivation of the left and right reel velocity and position feedback control signals is described. Motion of capstan 106 is detected by capstan tachometer 136 and converted to digital information by capstan tachometer circuit 138. The output of tachometer circuit 138 is coupled to a pair of divide by N counters 220 and 224 such that the output of divide by N circuit 220 is the forward capstan velocity $\dot{X}_c$ (FWD), and the output of divide by N circuit 224 is the reverse capstan velocity $\dot{X}_c$ (REV). Since the tape is looped in buffer columns 108 and 110, N is chosen to have a value of two. The capstan forward velocity signal $\dot{X}_c$ (FWD) is OR'ed with the right reel forward tape velocity $\dot{X}_R$ (FWD) in OR gate 226 and with the left reel forward tape velocity $\dot{X}_R$ (FWD) in OR gate 228. The capstan reverse velocity signal $\dot{X}_c$ REV) is OR'ed with the right reel reverse tape velocity $\dot{X}_R$ (REV) in OR gate 230 and with the left reel reverse tape velocity $\dot{X}_R$ (REV) in OR gate 232. The right reel forward and reverse tape velocity signals are coupled from right reel tachometer circuit 142 and the left reel forward and reverse tape velocity signals are coupled from left reel tachometer circuit 140. The outputs of OR gate 226 and of OR gate 230 are coupled to the input of the right reel digital integrator 154 which integrates the difference between the velocity inputs thereto and generates the analog position voltage $X_T$ of the vertical position of the tape in the right buffer column 110. The outputs of OR gate 228 and OR gate 232 are coupled to the input of left reel digital integrator 152 which, in a like manner to integrator 154, integrates the applied velocity signal difference to obtain the analog position voltage $X_T$ of the vertical position of the tape in the left buffer column 108. The right reel forward velocity pulses $\dot{X}_R$ (FWD) and right reel reverse velocity pulses $\dot{X}_R$ (REV) are also coupled to the right reel digital to analog converter 174 which generates the analog velocity voltage $\dot{X}_R$ for the right reel. Analog voltages $\dot{X}_R$ from D/A converter 174 and $X_T$ from the right reel integrator 154 are combined and serve as the control voltage inputs to the right reel servo amplifier 150. Similarly, the left reel forward velocity pulses $\dot{X}_R$ (FWD) and left reel reverse velocity pulses $\dot{X}_R$ (REV) are coupled to the left reel digital to analog converter 168 which generates the analog velocity voltage $\dot{X}_R$ for the left reel. Analog voltages $\dot{X}_R$ from D/A converter 168 and $X_T$ from the left reel integrator 152 are combined and serve as the control voltage inputs to the left reel servo amplifier 146.

A central computer or controller serves to generate the system commands for both the capstan control circuit 116 which includes a control portion 234 and a power amplifier 236, the output of which amplifier controls the speed of the capstan motor 114.

Figure 6:
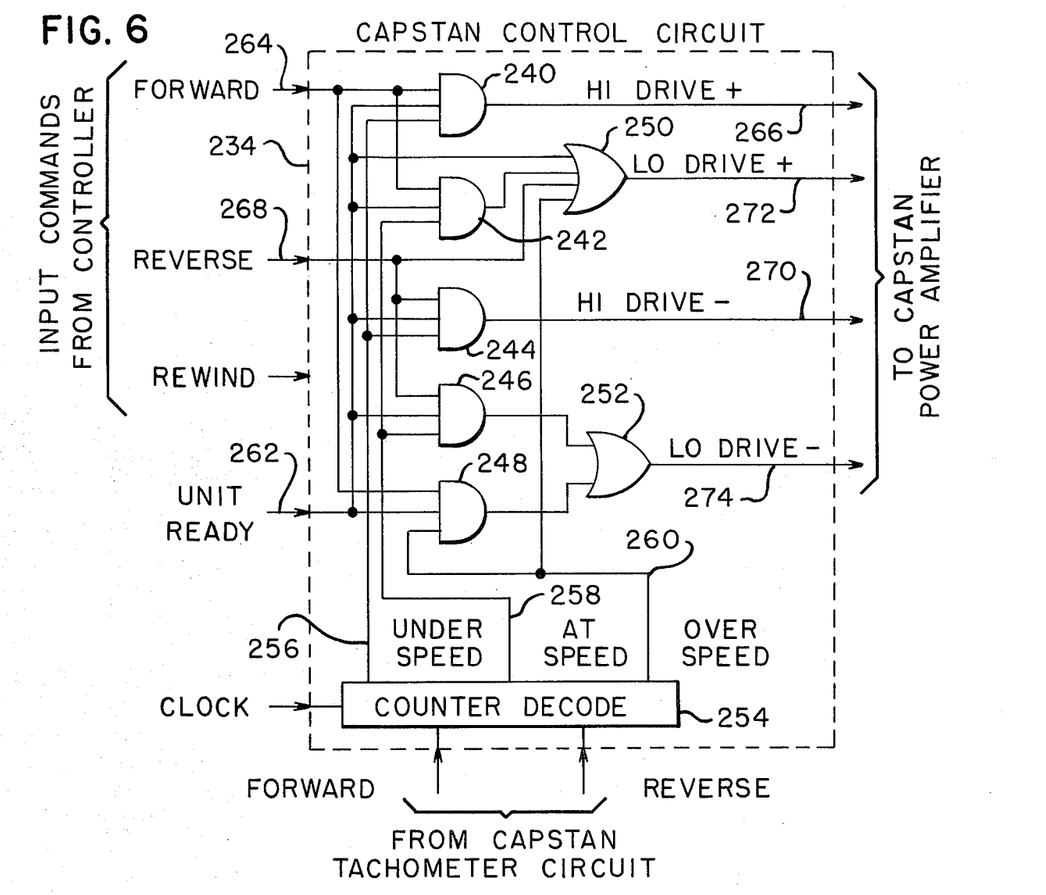
FIG. 6 is a circuit diagram of a capstan control circuit which may be utilized in the present invention.

Referring now to FIG. 6, the capstan control circuit 234 is illustrated for the forward and reverse operating modes of the capstan which correspond to bidirectional rotation thereof. FORWARD, REVERSE and UNIT READY commands from the controller are logically combined by AND gates 240, 242, 244, 246 and 248 and OR gates 250 and 252 with the forward and reverse capstan velocity pulses from capstan tachometer circuit 138 to produce the drive voltages required by the capstan power amplifier 236. The control circuit 234 has provision for a rewind mode of operation, which capability is indicated but not described in detail, and which may be conventionally implemented. An external clock from the controller clocks an up-down decode counter 254 to count the forward and reverse capstan velocity pulses and produce an output on line 256 when the capstan velocity is underspeed, an output on line 258 when the capstan velocity is at the correct speed, and on line 260 when the capstan velocity is overspeed.

Figure 7:
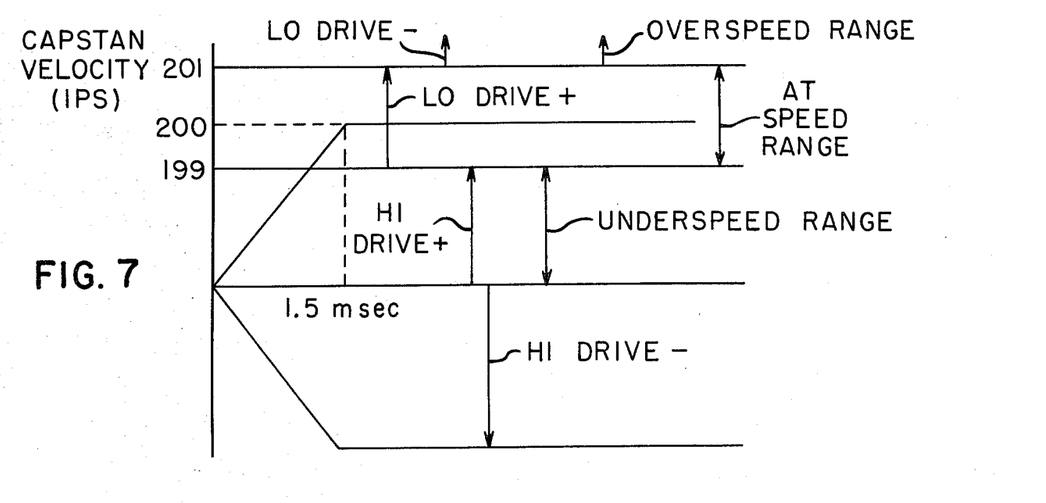
FIG. 7 is a waveform diagram illustrative of the operation of the circuit of FIG. 6.

FIG. 7 illustrates an exemplary capstan velocity range which corresponds to the control logic described by FIG. 6. The capstan is at its correct operating velocity at a capstan linear tape velocity of 200 inches per second which, in accordance with the capstan velocity versus time curve of FIG. 7, should occur after approximately 1.5 milliseconds of acceleration from a stopped condition. The capstan is accelerated when in the underspeed range of less than 199 inches per second, decelerated when in the overspeed range of greater than 200 inches per second, and maintained at its instantaneous velocity when in the "at speed" range between 199 and 200 inches per second.

The direction of rotation of the capstan and the magnitude of the voltage generated for application to the capstan power amplifier 236 is determined as follows. For any driving voltage to be generated, the UNIT READY input must be present on the UNIT READY line 262. In the underspeed condition, an output from the decode counter 254 is present on the UNDERSPEED line 256. When the UNDERSPEED signal, the UNIT READY signal and the FORWARD signal on line 264 appear in coincidence at AND gate 240, a Hi Drive positive voltage is generated on line 266. When the UNDERSPEED signal, the UNIT READY signal, and the REVERSE signal on line 268 appear in coincidence at AND gate 244, a Hi Drive negative voltage is generated on line 270. When the AT SPEED signal on line 258, the UNIT READY signal on line 262 and the FORWARD signal on line 264 appear in coincidence at AND gate 242, an output is applied from AND gate 242 to one of the inputs of OR gate 250, which generates a Lo Drive positive voltage when an OVERSPEED signal, or a REVERSE signal is present, the Lo Drive positive voltage appearing on line 272. When the OVERSPEED signal, the UNIT READY signal and the FORWARD command appear in coincidence at AND gate 248, the output from AND gate 248 is applied to one input of OR gate 252. A UNIT READY command together with an AT SPEED signal and a REVERSE command in coincidence at the input to AND gate 246 causes AND gate 246 to generate an output which, when applied as the second input to OR gate 252 with the output of AND gate 248 as the first input, results in the generation of a Lo Drive negative voltage on line 274.

Figure 8:
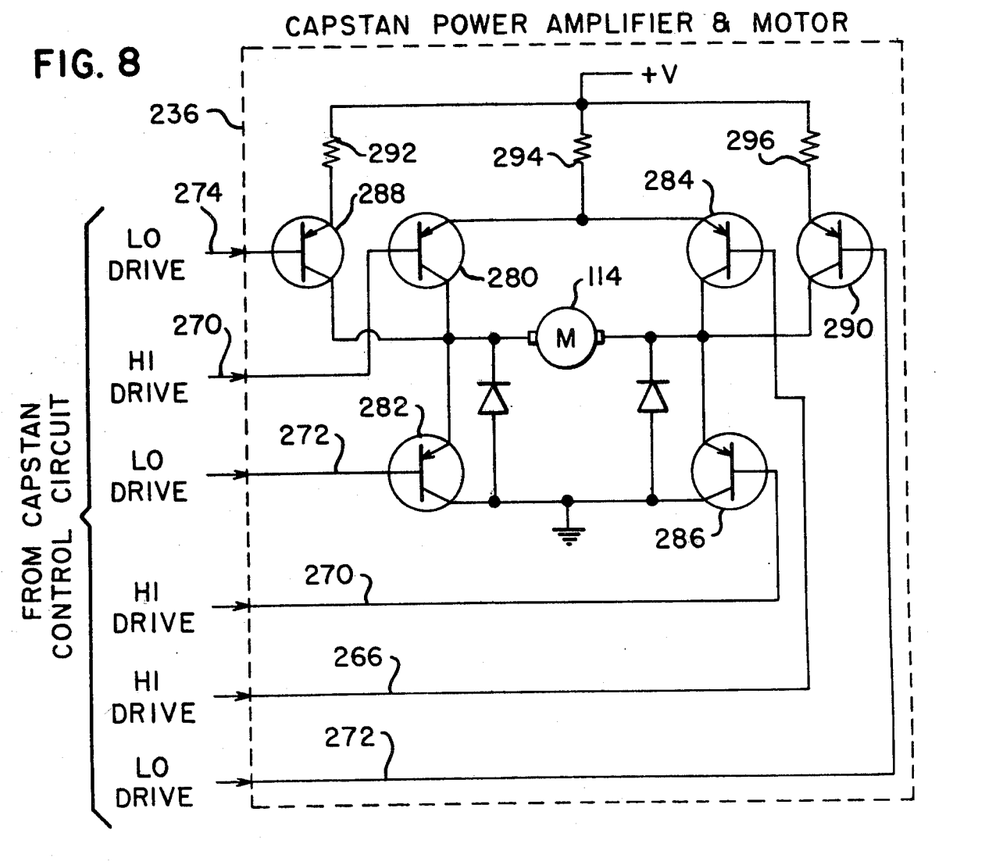
FIG. 8 is a circuit diagram of a capstan power amplifier which may be utilized in the present invention.

The capstan power amplifier 236 which couples the desired excitation voltage to capstan motor 114 may comprise a variety of designs. An exemplary capstan amplifier circuit capable of utilizing the drive voltages generated by the capstan control circuit 234 is illustrated by FIG. 8, wherein the capstan motor 114 is reversibly energized by means of a six transistor bridge network in which the Hi and Lo drive positive and negative voltages from capstan control circuit 234 are amplified and applied to the motor 114. Transistors 280, 282, 284, 286, 288 and 290 are switchable ON and OFF such that the Lo Drive negative voltage is applied to the motor by transistors 288 and 286, the Hi Drive negative voltage by transistors 280 and 286, the Lo Drive positive voltage by transistors 282 and 290, and the Hi Drive positive voltage by transistors 284 and 282. Biasing is provided by resistors 292, 294 and 296 for the applied voltage.

Figure 9:
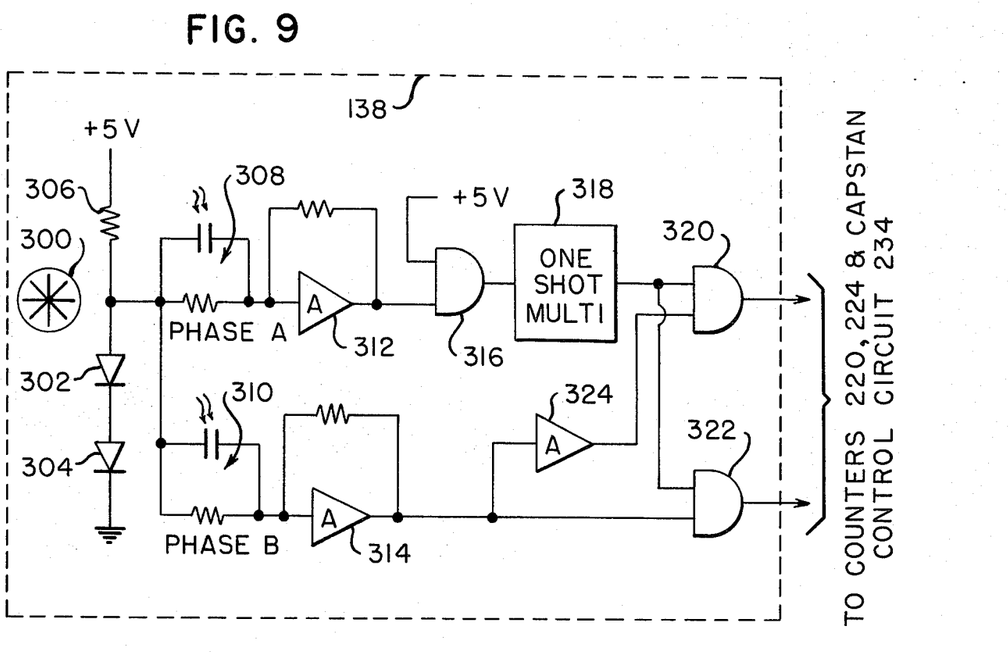
FIG. 9 is a circuit diagram of a tachometer circuit in accordance with the present invention.

Referring now to FIG. 9, the capstan tachometer circuit 138 is illustrated. Right reel tachometer circuit 142 and left reel tachometer circuit 140 are substantially identical to the illustrated capstan tachometer circuit 138, hence the description thereof which follows is also descriptive of the right and left reel tachometer circuits 142 and 140 respectively.

A tachometer disc 300 having optically transmissive and opaque portions thereon is rotatably fixed to the capstan drive from motor 114 such that light transmitted by light emitting diodes 302 and 304, supplied from a 5 volt source through resistor 306, impinges upon the rotating disc 300 to cause a pulsed optical output which is alternately sensed by photocells 308 and 310, with the output of photocell 308 being phased to lead the output of photocell 310 by 90°. The phase A output of photocell 308 and the phase B output of photocell 310 are amplified by a pair of frequency compensated operational amplifiers 312 and 314 respectively. The amplified phase A output then, when present, couples a 5 volt DC voltage through AND gate 316 to the input of a single shot multivibrator 318, which generates a pulse in response to the receipt thereof of each phase A signal. The output pulses from multivibrator 318 are coupled to one of the inputs of AND gate 320 and to one of the inputs of AND gate 322. The amplified phase B signal is coupled directly to the other input of AND gate 322 and, after additional amplification by inverting amplifier 324, is also coupled to the other input of AND gate 320. The output of AND gates 320 comprises the capstan forward velocity pulses, the waveform of which is illustrated by FIG. 10C, while the output of AND gate 322 comprises the capstan reverse velocity pulses, the waveform of which is illustrated by FIG. 10F. The phase A and phase B forward motion signals are shown by waveforms 10A and 10B respectively, while the phase A and phase B reverse motion signals are shown by waveforms 10D and 10E respectively. The capstan forward and reverse velocity pulses are coupled via the divide by N counters 220 and 224 to the digital integrators for derivation of the position feedback voltages $X_T$ which are coupled to the right and left reel servo amplifiers, together with the outputs of the right and left reel tachometer circuits, via OR gates 226 through 232 as described with reference to FIG. 5.

Figure 11:
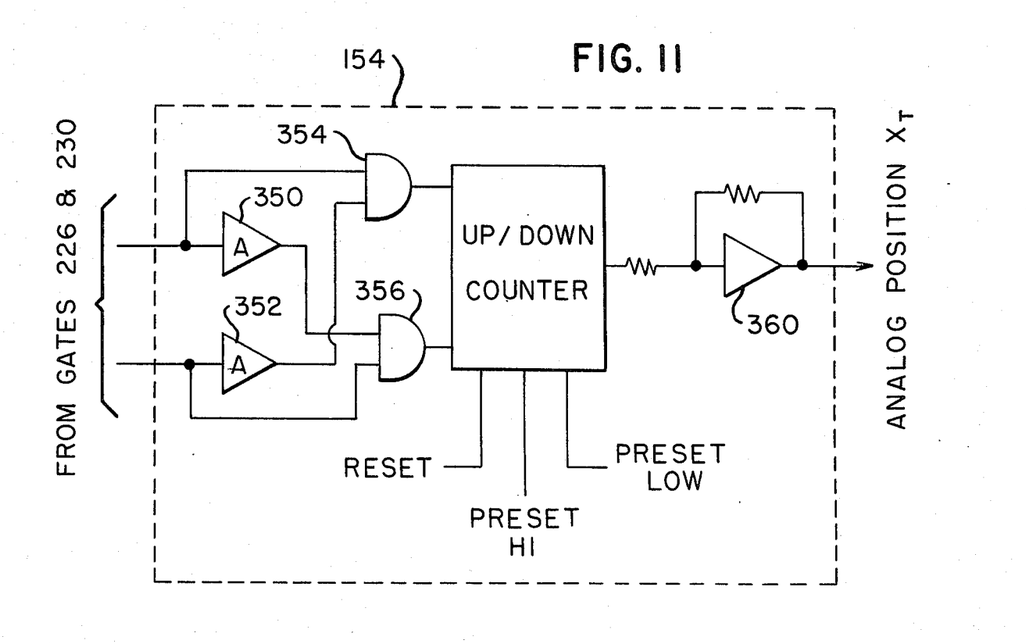
FIG. 11 is a circuit diagram of a digital integrator utilized in the present invention.

Referring now to FIG. 11, the right reel integrator circuit 154 is illustrated. The circuit configuration of right reel integrator 154 is identical to the configuration of left reel integrator circuit 152, hence the description which follows is also descriptive of the left reel integrator circuit 152.

Digital integrator 154 integrates the velocity difference between the capstan velocity and the right reel tape velocity and derives an analog of the tape loop position in the right buffer column. The integrator 154 inputs from OR gates 226 and 230 are coupled to an exclusive OR network comprised of inverting amplifiers 350 and 352 and AND gates 354 and 356. The output of AND gate 354 provides the up-count while the output of AND gate 356 provides the down-count for an 8-bit up/down counter 358, which counter is capable of reset, preset low and preset high counts as more fully described with reference to FIG. 14. The up-count is indicative of a forward or positive polarity output while a down-count is indicative of a reverse or negative polarity output.

FIG. 10G illustrates the linearity of the capstan acceleration from 0 to 100 percent of desired velocity. The attaining of 100 percent velocity by the capstan corresponds generally with the capstan tachometer circuit output, illustrated for phase A by waveform 10H, which reaches a steady state frequency at approximately 100 percent velocity. The digital tape position $X_T$ output of counter 358 is converted to an analog position signal $X_T$ having a constant slope by a frequency compensated operational amplifier 360. FIG. 10I illustrates the constant slope of the analog position signal $X_T$.

The reel velocity analog signal for the right reel is, as previously described, scaled and combined with the scaled analog position signal for the right buffer column tape loop and supplied to the right reel servo amplifier, which servo amplifier is a gain compensated operational amplifier. This right reel control voltage, after amplification, is applied to right reel motor 148 and is illustrated by waveform 10J.

Figure 12:
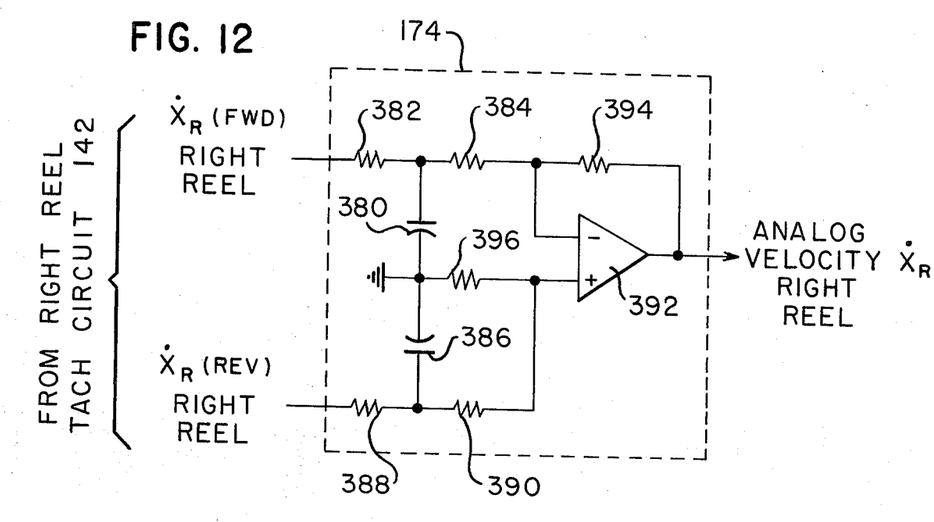
FIG. 12 is a circuit diagram of a digital to analog network utilized in the present invention.

Referring now to FIG. 12, the right reel digital to analog converter circuit 174 is illustrated. Right reel D/A circuit 174 and left reel D/A circuit 152 are of identical configuration. The output of the right reel tachometer circuit 142 reaches a constant frequency once the right reel is accelerated to its running speed. FIG. 10K illustrates the waveform of the right reel tachometer frequency as it reaches steady state. The digital right reel forward velocity pulses $\dot{X}_R$ (FWD) are coupled to an RC network comprised of capacitor 380 and resistors 382 and 384. The digital right reel reverse velocity pulses $\dot{X}_R$ (REV) are coupled to a second RC network comprised of capacitor 386 and resistors 388 and 390. The forward velocity signal through resistor 384 is coupled to the negative input of a frequency compensated operational amplifier 392, with frequency compensation being provided by compensation resistor 394, and the reverse velocity signal through resistor 390 is coupled to the positive input of the amplifier 392, which is grounded through resistor 396, to derive the right reel analog velocity voltage $X_R$ which is illustrated by waveform 10I. The left reel analog velocity voltage is identically derived by the left reel D/A circuit 70.

While the invention as heretofore described does not require the use of loop sensors as does the prior art, the embodiment of the invention described with reference to FIGS. 13 and 14 utilize a minimum of such sensors to provide for system shutdown and calibration in the event of a system failure or an erroneous data input. In the operation of magnetic tape transport systems of the type described herein, tape slippage or system noise sometimes occurs which, when integrated over a period of time might result in an erroneous calculation of the tape loop position in either the right or left buffer column. In accordance with another embodiment of the present invention, the following configurations of loop position sensors may be employed:

Configuration 1. one center loop position sensor at the midpoint of each buffer column.

Configuration 2. a short loop position sensor in proximity to the top of each buffer column and a long loop position sensor in proximity to the bottom of each buffer column.

Configuration 3. a short loop position sensor, a long loop position sensor and a center loop position sensor in each buffer column.

Figure 13:
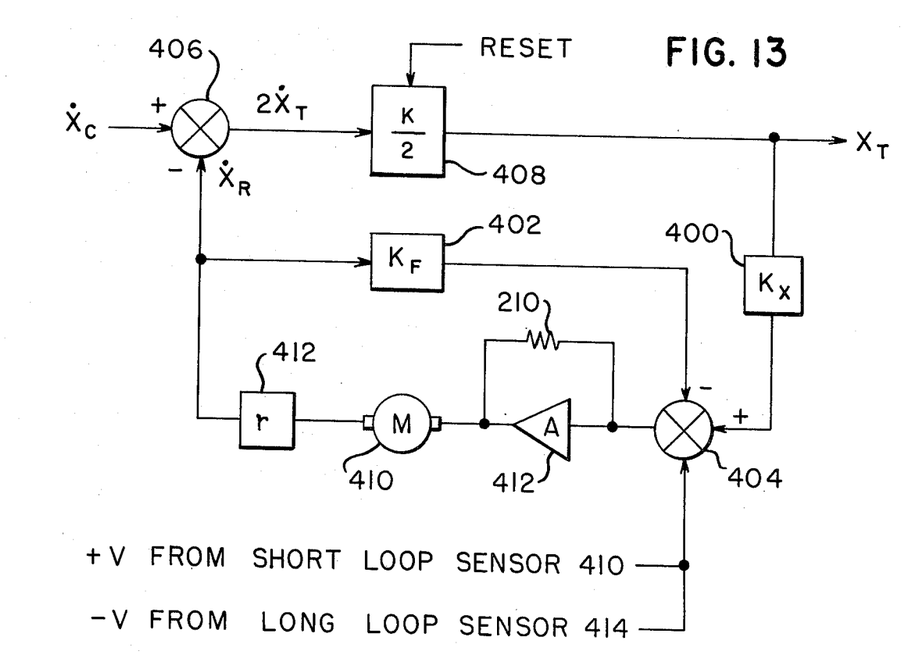
FIG. 13 is a block diagram of another embodiment of the present invention.

Operationally, the reel control servo arrangement of FIG. 13 is substantially identical in function to the control system described with reference to FIG. 3, and reference should be made to the description of FIG. 3 for details of the operation of the embodiment of FIG. 13, as only those areas of departure in operation of FIG. 14 from FIG. 3 will be hereinafter described in detail.

Figure 14:
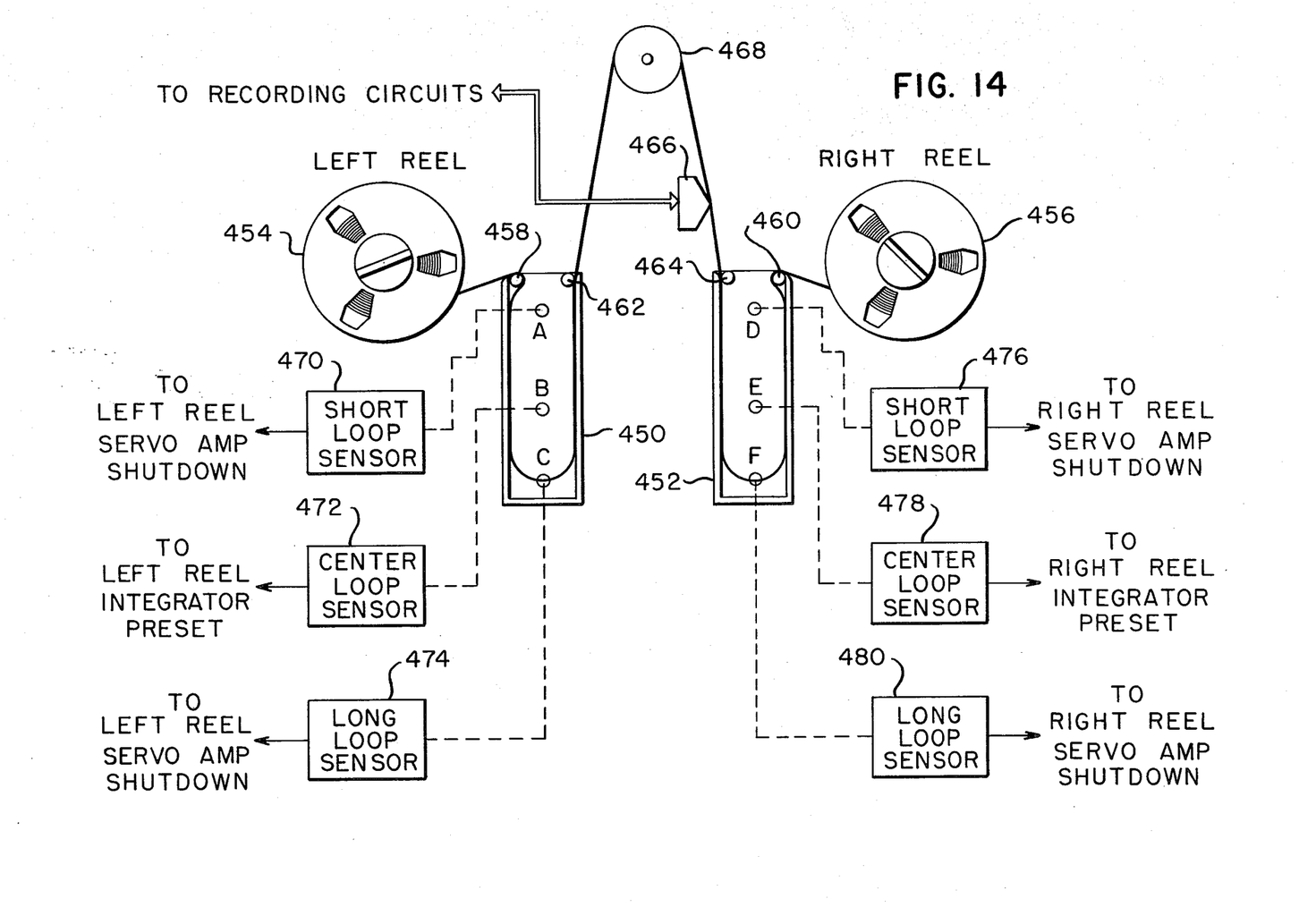
FIG. 14 is a block diagram of certain features of the embodiment of FIG. 13.

The loop scaling value 400 and the speed scaling value 402 of the embodiment illustrated by FIG. 13 are deliberately under-valued such that the tape in the left and right buffer columns 450 and 452, respectively, will migrate in the direction of the extreme position sensors illustrated by FIG. 14 during steady state forward or reverse tape motion. An exemplary steady state operating position of the tape loops in the buffer columns is illustrated by FIG. 14. This arrangement prevents the migration of the tape toward the undesired end of the buffer columns due to cumulative error in the tape loop position calculations.

Buffer columns 450 and 452 of FIG. 14 contain tape moving onto and off of reels 454 and 456, over guide tachometers 458 and 460, bearings 462 and 464 and past a magnetic head 466, in proximity to a capstan 468. While the above configuration 3 of loop sensors is illustrated, it is to be understood that FIG. 14 is also illustrative of configuration 1 by the elimination of sensors A and C from buffer column 450 and sensors D and F from buffer column 452; and is also illustrative of configuration 2 by the elimination of sensors B and E from buffer columns 450 and 452, respectively.

Buffer column 450 contains a short loop position sensing port A, a long loop position sensing port C and a center loop position sensing port B. Similarly, buffer column 452 contains a short loop position sensing port D, a long loop position sensing port F and a center loop sensing port E. Each of the sensing ports A through F are connected to differential pressure sensors which are capable of sensing the pressure difference caused by the vertical passage of the tape through the region of the respective port. Such sensors are well known and may comprise photoelectric, electrical or mechanical types which effectively sense the tape loop position within the buffer column. Sensors 470, 472 and 474 are associated with sensing ports A, B and C, respectively, of the left buffer column 450 and sensors 476, 478 and 480 are associated with sensing ports D, E and F, respectively, of the right buffer column 452.

Right short loop sensor 476 generates a positive voltage in response to a sensed pressure change which voltage is applied as additional drive at the summing junction 404, while right long loop sensor 480 generates a negative voltage in response to a sensed pressure change which voltage, when applied at summing junction 404 reduces the servo drive, either of which events causes the motor 204 to maintain the right reel speed at the required average value due to the added voltage compensation.

The capstan velocity signal and right reel velocity signal are combined at junction 406, with the difference being integrated and divided by two by integrator 408 as previously described. The undervalued loop scaling factor $K_x$ causes the tape loop position signal $X_T$ to be undervalued resulting in the tape loop not stabilizing at the center of the buffer. Stabilization does not occur until the position voltage is corrected, which does not occur until the tape passes a long or short loop sensor which causes the correcting voltage to be generated. Similarly, the reel tape velocity signals are undervalued due to the effect of the undervalued velocity scaling factor $k_F$, with compensation occuring only upon passage of an extreme position sensor by the tape loop, at which time additional drive is applied at junction 404. The motor 410 is then controlled by servo amplifier 412 to drive the right reel 412 identically as described with reference to FIG. 3.

The output of right reel center loop sensor 478 may be coupled to the reset gate of counter 358 of the right reel digital integrator for system calibration, while the outputs of short loop sensor 476 and long loop sensor 480 may be coupled either to the reset gate or preset to all "ones" gate of the counter 358 to shut down the system in the event that the tape passes either ports D or F. The same arrangement is employed by the left reel control with the outputs of sensors 470 through 474 being coupled to left reel integrator 152. It is thus apparent that the loop sensor arrangement shown by FIGS. 13 and 14 may effectively be used in a transport system as shown by FIG. 4.

While several preferred embodiments of the invention have been described, many modifications will be apparent from the within description to those skilled in the art. For example, the invention has been described in the context of a single capstan system, although by duplication of the described control circuitry, the invention is applicable to a dual capstan tape transport.

What is claimed is:

1. A linear reel control system for bidirectionally transferring a flexible material between a supply or take-up reel and a capstan drive while maintaining a substantially minimized length loop of said flexible material between said reel and said capstan drive comprising:
    means for deriving a first control signal indicative of the velocity of said material between said loop and said reel;
    means for deriving a second control signal indicative of the velocity of said material between said loop and said capstan drive;
    means for continuously integrating the difference between said first and second control signals to derive a third control signal indicative of the position of said loop; and
    motive means continuously responsive to said first and third control signals for driving said reel.

2. A linear reel control system in accordance with claim 1 wherein said first and second control signals are bipolar and of complementary polarity.

3. A linear reel control system in accordance with claim 2 wherein said second control signal is coupled to said capstan drive.

4. A servo system for maintaining substantially linear acceleration of a tape loop in a buffer column of a tape transport during tape acceleration intervals and substantially constant tape loop position and substantially minimized tape loop length in said buffer column during steady state intervals, said buffer column being disposed between a supply or take-up reel driven by said servo system, and a drive capstan, comprising:
    means for generating an electrical signal indicative of the tape velocity at said capstan;
    means for generating a first servo control signal indicative of the tape velocity between the buffer column and the reel;
    velocity feedback means including means for coupling said first servo control signal to said servo; and
    position feedback means including means for continuously integrating the difference between said electrical signal and said first servo control signal to derive a second servo control signal; and
    means for continuously coupling said second servo control signal to said servo.

5. A servo control system in accordance with claim 4 including:
    motive means responsive to said electrical signal for driving said capstan.

6. A single capstan magnetic tape transport wherein a substantially minimized tape loop length is maintained in its associated buffer columns without the use of loop column sensors, comprising:
    right and left storage reels between which magnetic tape is transferable;
    right and left reel motive means for bidirectionally driving said right and left storage reels in response to a right reel control signal coupled to said right reel motive means and a left reel control signal coupled to said left reel motive means;
    right and left buffer columns for providing low impedance tape paths between said right and left reels;
    a capstan disposed between said buffer columns for bidirectionally transferring tape therebetween;
    means for deriving a bipolar capstan velocity signal;
    means for deriving a first velocity signal indicative of the tape velocity between said right reel and said right buffer;
    means for deriving a second velocity signal indicative of the tape velocity between said left reel and said left buffer;
    first combining means for algebraically adding said capstan velocity signal and said first velocity signal to derive a first difference signal;
    second combining means for algebraically adding said capstan velocity signal and said second velocity signal to derive a second difference signal;
    first and second integrating means for integrating said first and second difference signals respectively to provide a right loop position signal indicative of the position of the tape in said right buffer column and a left loop position signal indicative of the position of the tape in said left buffer column;
    third combining means for algebraically adding said first velocity signal and said right loop position signal for generating said right reel control signal; and
    fourth combining means for algebraically adding said second velocity signal and said left loop position signal for generating said left reel control signal.

7. A tape transport in accordance with claim 6 wherein said first and second velocity signals are bipolar.

8. A tape transport in accordance with claim 7 wherein said means for deriving said capstan velocity signal, said means for deriving said first velocity signal and said means for deriving said second velocity signal comprises tachometers.

9. A tape transport in accordance with claim 7 wherein said third and fourth combining means comprise servo amplifiers.

10. A tape transport in accordance with claim 7 further comprising:
    capstan motive means responsive to said capstan velocity signal for driving said capstan.

11. A single capstan magnetic tape transport system having first and second take up reels between which magnetic tape is bidirectionally transported and first and second buffer columns into which the magnetic tape is looped to provide low inertia buffering between the tape reels and the capstan comprising:

capstan drive means for bidirectionally rotating said capstan such that magnetic tape is transferred from said first buffer column to said second buffer column or from said second buffer column to said first buffer column;

capstan tachometer means mechanically coupled to said capstan for providing a capstan velocity signal;

first and second reel tachometers for providing first and second reel tape velocity signals;

circuit means for combining said capstan velocity signal with said first and second reel tape velocity signals to derive a first tape position signal continuously indicative of the position of the tape loop in said first buffer column and a second tape position signal continuously indicative of the position of the tape loop in said second buffer column;

first and second driving means mechanically coupled to said first and second reels, said first driving means being controlled by said first tape position signal and said second driving means being controlled by said second tape position signal for continuously driving said reels to maintain substantially constant and minimized lengths of tape in said first and second buffer columns.

12. A tape transport system in accordance with claim 11 further comprising:

means for combining said first and second reel tape velocity signals with said first and second tape position signals for deriving first and second composite control signals; and means for coupling said composite control signal to said first driving means and said second composite control signal to said second driving means such that said first and second driving means maintain substantially linear acceleration of tape in said first and second buffer columns, without the use of loop position sensors.

13. A tape transport system in accordance with claim 12 further comprising:

capstan control means having at least two inputs for receiving capstan control data at one of said inputs and said capstan velocity signals at the other of said inputs, and having an output coupled to said capstan drive means for intermittently rotating said capstan in response to said capstan control data and in response to said capstan velocity signals.

14. A tape transport system in accordance with claim 11 wherein said circuit means for combining said capstan velocity signals with said first and second reel tape velocity signals includes:

a first digital integrator for integrating the difference between said capstan velocity signal and said first reel tape velocity signal to derive said first tape position signal; and a second digital integrator for integrating the difference between said capstan velocity signals and said second reel tape velocity signal to derive said second tape position signal.

15. A tape transport system in accordance with claim 14 further comprising:

first and second loop position sensing means associated with said first and second buffer columns respectively for generating respective loop sensing signals when the associated loop passes said sensing means.

16. A tape transport in accordance with claim 15 wherein said sensing means are generally centrally located in said buffer columns.

17. A tape transport system in accordance with claim 15 wherein said loop sensing signals are coupled respectively to said first and second integrating means.

18. A tape transport system in accordance with claim 11 further comprising:

a first pair of loop position sensing means located near either end of said first buffer column and a second pair of loop position sensing means located near either end of said second buffer column for generating respective loop position sensing signals when said respective loop passes said sensing means; and first and second voltage drive means associated with said first and second sensing means respectively for varying the magnitude of said first and second tape position signals when a respective loop is sensed by said sensing means.

19. A system for transporting web material between a web storage reel and a drive capstan comprising:

low inertia buffer means disposed between said reel and said capstan containing a loop of said web material;

means for deriving a first velocity signal indicative of the velocity of web material into said buffer means from said reel;

means for deriving a second velocity signal indicative of the velocity of web material out of said buffer means toward said capstan;

first combining means for generating a third velocity signal indicative of the difference between said first and second signals;

means for integrating said third velocity signal for generating a position signal indicative of the position of web material in said buffer means;

second combining means for combining said first velocity signal and said position signal for generating a reel control signal; and motive means continuously responsive to said reel control signal and having a substantially linear frequency response for driving web storage reel.

20. A system in accordance with claim 19 wherein said first and second velocity signals are bipolar, the polarity of said velocity signals being complementary and determined by the direction of travel of said web material.

21. A system in accordance with claim 20 wherein said buffer means comprises a vacuum column.

22. A system in accordance with claim 21 wherein said second combining means comprises a servo amplifier having position feedback and velocity feedback control, said first velocity signal comprising said velocity feedback and said position signal comprising said position feedback.

23. A system in accordance with claim 19 further comprising:

capstan motive means responsive to said second velocity signal for bidirectionally driving said capstan.

24. A system for transferring a flexible material between a reel and a material drive while maintaining a substantially minimized length loop of material between said reel and said drive comprising:

means for deriving a first control signal indicative of the velocity of said material between said loop and said reel;

means for deriving a second control signal indicative of the velocity of said material between said loop and said drive;

means for continuously integrating the difference between said first and second control signals to derive a third control signal indicative of the position of said loop; and motive means substantially continuously responsive to said third control signal for driving said reel.

25. A system in accordance with claim 24 wherein said drive is a capstan drive.

26. A system in accordance with claim 25 wherein said motive means is additionally substantially continuously responsive to said first control signal.

27. A transport system in which web material is bidirectionally transferred between a reel and a web material drive comprising:

buffer means for providing a loop of material between said reel and said web material drive;

means for generating a velocity feedback signal indicative of the velocity of web material between said reel and said buffer;

means for generating a position feedback signal which is continuously indicative of the position of said loop of web material in said buffer;

combining means for combining said velocity and position feedback signals to derive a reel control signal;

motive means responsive to said reel control signal for driving said reel while maintaining a substantially linear acceleration of said loop in said buffer; and wherein said means for providing a position feedback signal includes:

means for generating an electrical signal indicative of the velocity of web material between said web material drive and said loop;

means for algebraically combining said electrical signal and said velocity feedback signal to derive a difference velocity signal;

means for digitally integrating said difference velocity signal; and digital to analog conversion means for converting said integrated difference velocity signal into said position feedback signal.

28. A transport system in accordance with claim 27 further including means for coupling said electrical signal to said web material drive.

29. A servo system for maintaining substantially linear acceleration of a tape loop in a buffer column of a tape transport during tape acceleration intervals and substantially constant tape loop position in said buffer column during steady state intervals, said buffer column being disposed between a supply or take-up reel driven by said servo system, and a drive capstan, comprising:

means for generating an electrical signal indicative of the tape velocity at said capstan;

means for generating a first servo control signal indicative of the tape velocity between the buffer column and the reel;

velocity feedback means including means for coupling said first servo control signal to said servo;

position feedback means including means for continuously integrating the difference between said electrical signal and said first servo control signal to derive a second servo control signal;

means for coupling said second servo control signal to said servo; and wherein said position feedback means includes digital combining means for algebraically combining said electrical signal and said first servo control signal to derive said difference signal;

means for digitally integrating said difference signal; and digital to analog converter means for converting said integrated difference signal into an analog voltage indicative of the position of said tape loop in the buffer column.

30. A servo system for maintaining substantially linear acceleration of a tape loop in a buffer column of a tape transport during tape acceleration intervals and substantially constant tape loop position in said buffer column during steady state intervals, said buffer column being disposed between a supply or take-up reel driven by said servo system, and a drive capstan, comprising:

means for generating an electrical signal indicative of the tape velocity at said capstan;

means for generating a first servo control signal indicative of the tape velocity between the buffer column and the reel, including a digital tachometer and a digital to analog converter for converting said first servo control signal to an analog velocity signal;

velocity feedback means including means for coupling said first servo control signal to said servo; and position feedback means including means for continuously integrating the difference between said electrical signal and said first servo control signal to derive a second servo control signal; and means for coupling said second servo control signal to said servo.

31. A servo control in accordance with claim 30 further including:

position scaling means for scaling said second servo control signal;

velocity scaling means for scaling said first servo control signal; and means for combining said scaled first and second servo control signals to derive a composite servo control signal.

32. A single capstan magnetic tape transport comprising:

right and left storage reels between which magnetic tape is transferable;

right and left reel motive means for bidirectionally driving said right and left storage reels in response to a right reel control signal coupled to said right reel motive means and a left reel control signal coupled to said left reel motive means;

right and left buffer columns for providing low impedance tape paths between said right and left reels;

a capstan disposed between said buffer columns for bidirectionally transferring tape therebetween;

tachometer means for deriving a bipolar capstan velocity signal;

tachometer means for deriving a first bipolar velocity signal indicative of the tape velocity between said right reel and said right buffer;

tachometer means for deriving a second bipolar velocity signal indicative of the tape velocity between said left reel and said left buffer;

first combining means for algebraically adding said capstan velocity signal and said first velocity signal to derive a first difference signal;

second combining means for algebraically adding said capstan velocity signal and said second velocity signal to derive a second difference signal;

first and second integrating means for integrating said first and second difference signals respectively to provide a right loop position signal indicative of the position of the tape in said right buffer column and a left loop position signal indicative of the position of the tape in said left buffer column;

third combining means for algebraically adding said first velocity signal and said right loop position signal for generating said right reel control signal; and fourth combining means for algebraically adding said second velocity signal and said left loop position signal for generating said left reel control signal; and wherein said first and second integrating means comprise digital integrators; wherein said tachometers are digital tachometers; and wherein said first and second integrator outputs are coupled respectively to first and second digital to analog converters such that the outputs of said digital to analog converters are continuous analog position signals.

33. A single capstan magnetic tape transport system having first and second take up reels between which magnetic tape is bidirectionally transported and first and second buffer columns into which the magnetic tape is looped to provide low inertia buffering between the tape reels and the capstan comprising:

capstan drive means for bidirectionally rotating said capstan such that magnetic tape is transferred from said first buffer column to said second buffer column or from said second buffer column to said first buffer column;

capstan tachometer means mechanically coupled to said capstan for providing a capstan velocity signal;

first and second reel tachometers for providing first and second reel tape velocity signals;

circuit means for combining said capstan velocity signal with said first and second reel tape velocity signals to derive a first tape position signal continuously indicative of the position of the tape loop in said first buffer column and a second tape position signal continuously indicative of the position of the tape loop in said second buffer column, wherein said circuit means includes:

a first digital integrator for integrating the difference between said capstan velocity signal and said first reel tape velocity signal to derive said first tape position signal;

a second digital integrator for integrating the difference between said capstan velocity signals and said second reel tape velocity signal to derive said second tape position signal;

first and second digital to analog conversion means for converting the outputs of said first and second integrators into analog voltages such that said first and second tape position signals are analog signals; and third and fourth digital to analog conversion means for converting said first and second reel tape velocity signals into first and second analog reel tape velocity voltages; and first and second driving means mechanically coupled to said first and second reels, said first driving means being controlled by said first tape position signal and said second driving means being controlled by said second tape position signal for maintaining substantially constant lengths of tape in said first and second buffer columns.

* * * * *